US005642147A

United States Patent [19]

Yamashita et al.

[11] Patent Number: 5,642,147

[45] Date of Patent: Jun. 24, 1997

[54] THERMAL PRINTER WITH LABEL PRINTING MODE

[75] Inventors: Akio Yamashita, Takizawa-mura; Kazutaka Suzuki, Tamayama-mura, both of Japan

[73] Assignee: Alps Electric Co., Ltd., Tokyo, Japan

[21] Appl. No.: 198,340

[22] Filed: Feb. 18, 1994

[30] Foreign Application Priority Data

Feb. 25, 1993 [JP] Japan .................................. 5-037049

[51] Int. Cl.$^6$ .............................. B41J 2/315; B41J 2/32; G01D 15/10

[52] U.S. Cl. .............................................................. 347/171

[58] Field of Search .................................... 347/171, 214; 400/207, 208.1, 208, 216, 605, 120, 120.13, 615.2, 708

[56] References Cited

U.S. PATENT DOCUMENTS

| | | | |
|---|---|---|---|
| 5,049,228 | 9/1991 | Sato | 156/384 |
| 5,082,381 | 1/1992 | Kishida et al. | 400/216 |
| 5,085,529 | 2/1992 | McGourty et al. | 400/120.13 |
| 5,183,333 | 2/1993 | Minowa | 400/605 |
| 5,209,151 | 5/1993 | Takagi et al. | 83/564 |
| 5,358,351 | 10/1994 | Murata et al. | 400/605 |

*Primary Examiner*—Joseph W. Hartary
*Assistant Examiner*—L. Anderson
*Attorney, Agent, or Firm*—Guy W. Shoup; Patrick T. Bever

[57] ABSTRACT

A thermal printer capable of producing labels, in addition to printing on normal paper. The printer includes a switching unit for switching between a label making mode and a normal printing mode. In the label making mode, characters are printed onto a receptor tape using a special label-making ink ribbon cassette. In the normal printing mode, a normal ink ribbon cassette is substituted for the special label-making cassette.

6 Claims, 7 Drawing Sheets

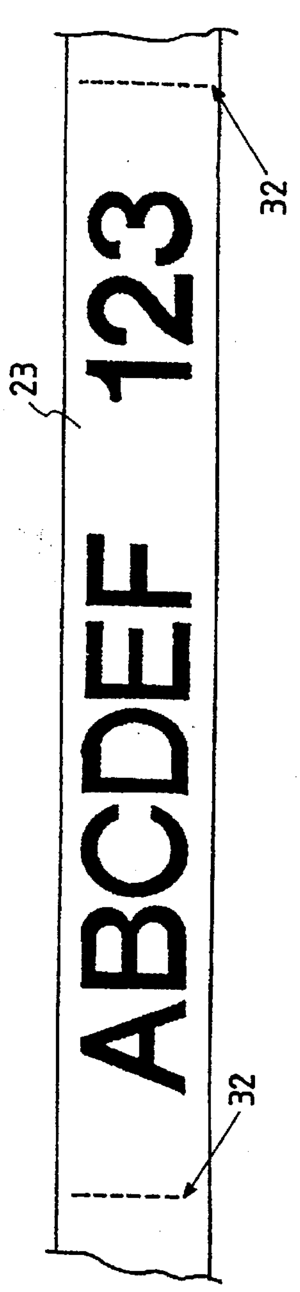
FIG. 7
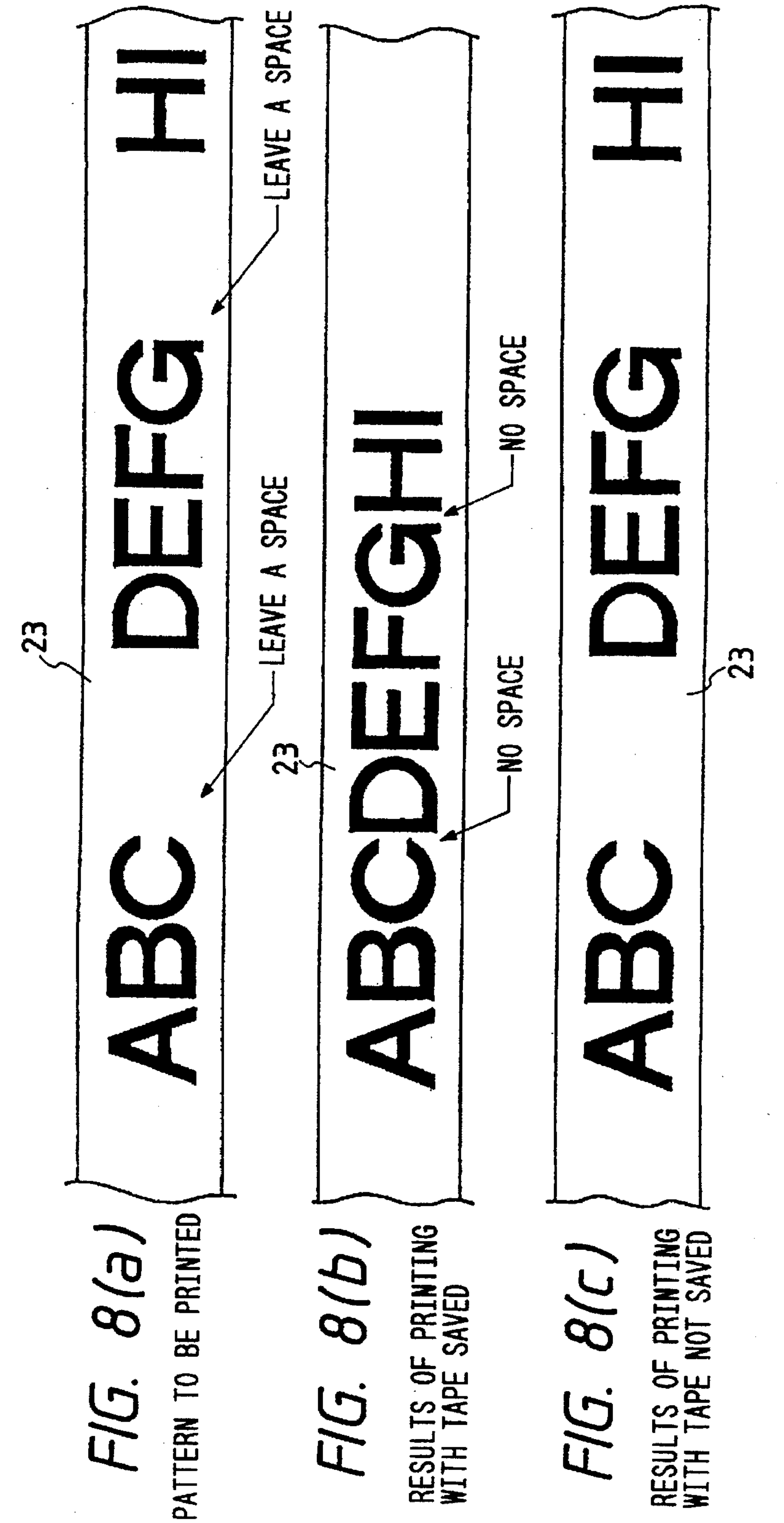
FIG. 8(a)
PATTERN TO BE PRINTED
FIG. 8(b)
RESULTS OF PRINTING WITH TAPE SAVED
FIG. 8(c)
RESULTS OF PRINTING WITH TAPE NOT SAVED

THERMAL PRINTER WITH LABEL PRINTING MODE

BACKGROUND OF THE INVENTION

1. Field of the Invention

The present invention relates to a thermal printer to be used as a printer for personal computers, word processors and the like. Particularly, the invention is concerned with a thermal printer which is constructed so as to permit use also as a label making printer for making labels.

2. Description of the Prior Art

Generally, a thermal printer has a carriage disposed in opposition to a platen and which is reciprocated along the platen. A thermal head capable of moving into contact with and away from the platen is supported by the carriage and it is possible to effect both printing of the type wherein printing is performed by pressing the thermal head directly to a thermal paper and a thermal printing using ribbon. In the thermal printing using ribbon, an ink ribbon cassette containing an ink ribbon with a part thereof drawn out so as to be positioned between printing paper and the thermal head is carried on the upper surface of the carriage. Further, a photosensor is disposed in a suitable position of the carriage.

The construction of an ink ribbon cassette 1 used commonly in such a thermal printer is shown in FIG. 10.

Within a cassette case 1A formed of a resin material, as shown in FIG. 10, there are disposed a feed reel with an ink ribbon 4 wound thereon and a take-up reel 3 for taking up the ink ribbon 4 after printing. Along the traveling path of the ink ribbon 4 are disposed a plurality of rotatable guide rollers 5. The ink ribbon 4 is drawn out from the feed reel 2, travels along the guide rollers 5, then is once drawn out to the exterior of the cassette case 1A in the position of an opening 6 which is for abutment of a thermal head 7 with the ink ribbon, then after used for printing, it is again drawn into the cassette case and wound onto the take-up reel 3.

A reflecting plate 8 is attached to the cassette case 1A in a position corresponding to the photosensor mounted on the carriage of the thermal printer, with the ink ribbon 4 therebetween. A ribbon end of the ink ribbon 4 is detected by the reflecting plate 8.

According to the above construction, at the time of printing, the ink ribbon 4 which is held together with paper between the thermal head 7 and the platen is drawn out from the feed reel 2 as the carriage travels, then the portion thereof which has been used for printing is separated from the paper and wound round the take-up reel 3.

The conventional thermal printer described above is for only printing characters onto standard-size papers such as size A4 and B4 papers as well as letter size and legal size papers, not having a label making function. For making labels, therefore, it has heretofore been necessary to use a machine exclusive for making labels.

SUMMARY OF THE INVENTION

Accordingly, it is an object of the present invention to provide a thermal printer for word processors and personal computers, having a label making function.

It is another object of the present invention to provide a thermal printer for printing out under reciprocation of a thermal head having a plurality of heating elements, the thermal printer having a first mode in which printing is made for label and a second mode in which printing is made for ordinary paper.

It is a further object of the present invention to provide a thermal printer having a paper detecting means disposed in a paper conveyance path and also having a controller which detects a printing mode of the printer and controls printing in accordance with the detected printing mode and a detected signal provided from the paper detecting means which signal indicates whether paper is present or not.

According to the above construction having the first and second modes, a single thermal printer having such construction permits both printing for ordinary paper and printing for label each under appropriate conditions.

Further, according to the above construction having the paper detecting means disposed in the paper conveyance path, the paper present in the paper conveyance path can be detected, so in the event an ordinary paper should be fed in the label printing mode it is possible to avoid the occurrence of an error in the printing operation, for example by warning the user of such error.

Mode 1 . . . a mode in which, after printing, the carriage is slowed down and non-print feed is performed at low speed.

Mode 2 . . . a mode in which, after printing, the carriage is moved a certain distance at the same speed and then slowed down.

Mode 3 . . . a mode in which, after printing, the carriage is slowed down at a gentle gradient while non-print feed is performed.

Mode 4 . . . a mode in which, in the case of operation at an extremely low speed, the carriage can be driven at the same speed in all of slow-up, printing and slow-down.

Mode 5 . . . a mode in which, until the end of printing there is performed the same motion as in the ordinary paper printing mode, and thereafter the carriage returns to a suitable position and then only the "operation of non-print feed" is performed;

FIG. 7 is an explanatory view showing an example in which dotted lines for cutting are printed at a desired label length by means of the thermal printer of the embodiment;

FIGS. 8(*a*), 8(*b*) and 8(*c*) are explanatory views showing different results of pattern printing obtained in a leaving motion and a pressing motion, respectively, of a thermal head, in which (a), (b) and (c) are as follows:

(a) . . . layout sample (b) . . . results of printing obtained in a spaced state of the thermal head from the platen (with tape saved)

Figure 9A:
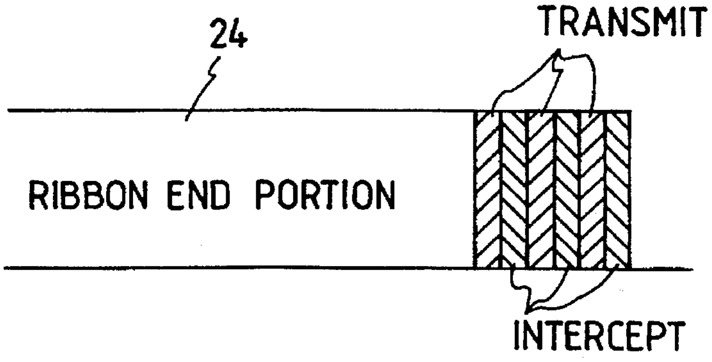
Figure 9B:
Figure 10:
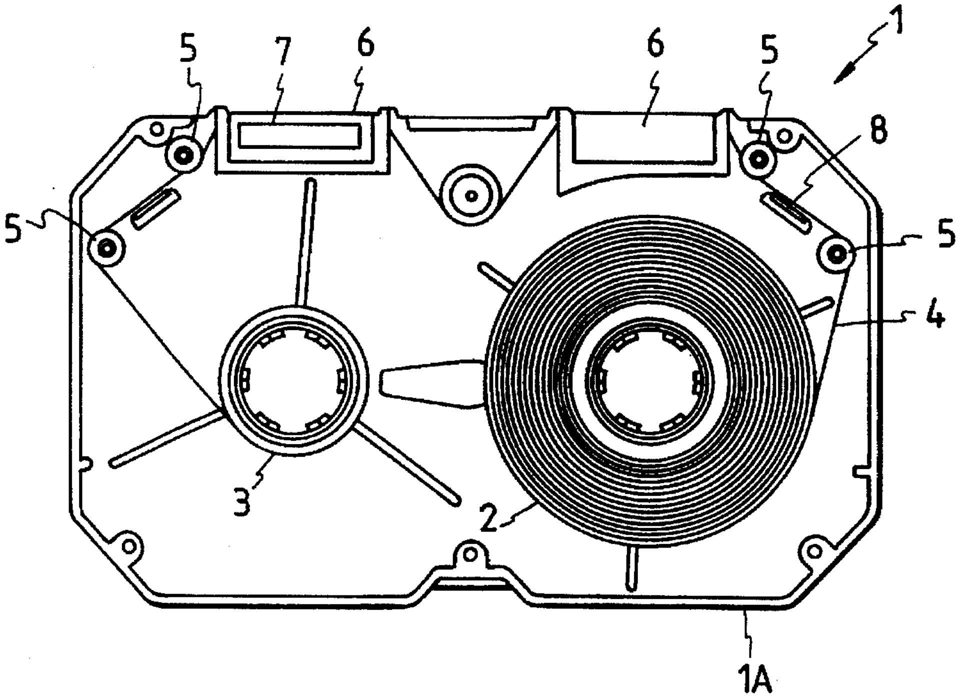
FIG. 10 PRIOR ART

(c) . . . results of printing obtained in a pressed state of the thermal head to the platen (with tape not saved);

FIGS. 9(*a*), 9(*b*) and 9(*c*) are diagrams for explaining the principle of detecting an ink ribbon end in an ink ribbon cassette used in the second mode of the embodiment, in which:

(a) is a diagram showing a zebra pattern at the ink ribbon end, and (b) is a diagram showing ON and OFF conditions of outputs provided from a photosensor portion upon detection of the zebra pattern; and FIG. 10 is a plan view showing an example of a conventional ink ribbon cassette.

DETAILED DESCRIPTION OF THE PREFERRED EMBODIMENT

The present invention will be described in detail hereinunder on the basis of the embodiment thereof illustrated in the drawings.

Figure 1:
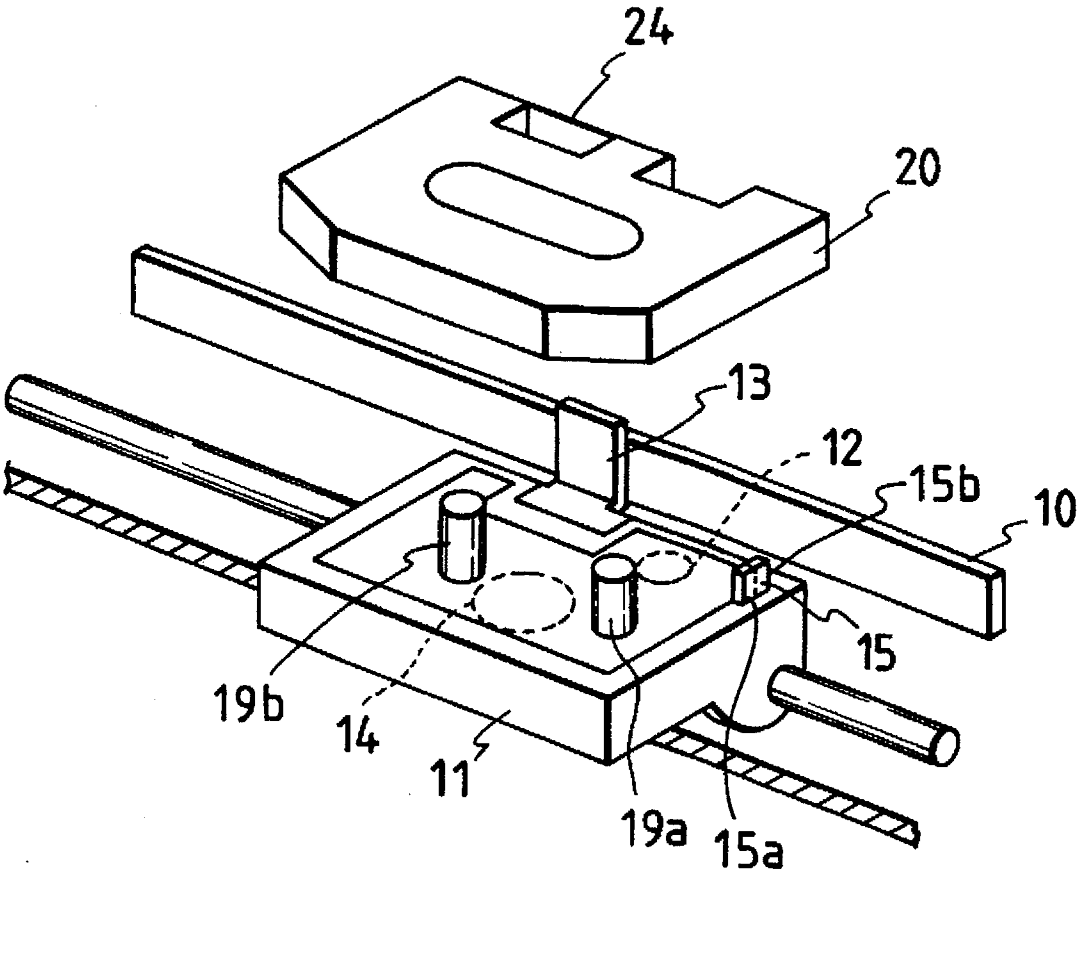
FIG. 1 is a schematic perspective view of a thermal printer according to an embodiment of the present invention.
Figure 2:
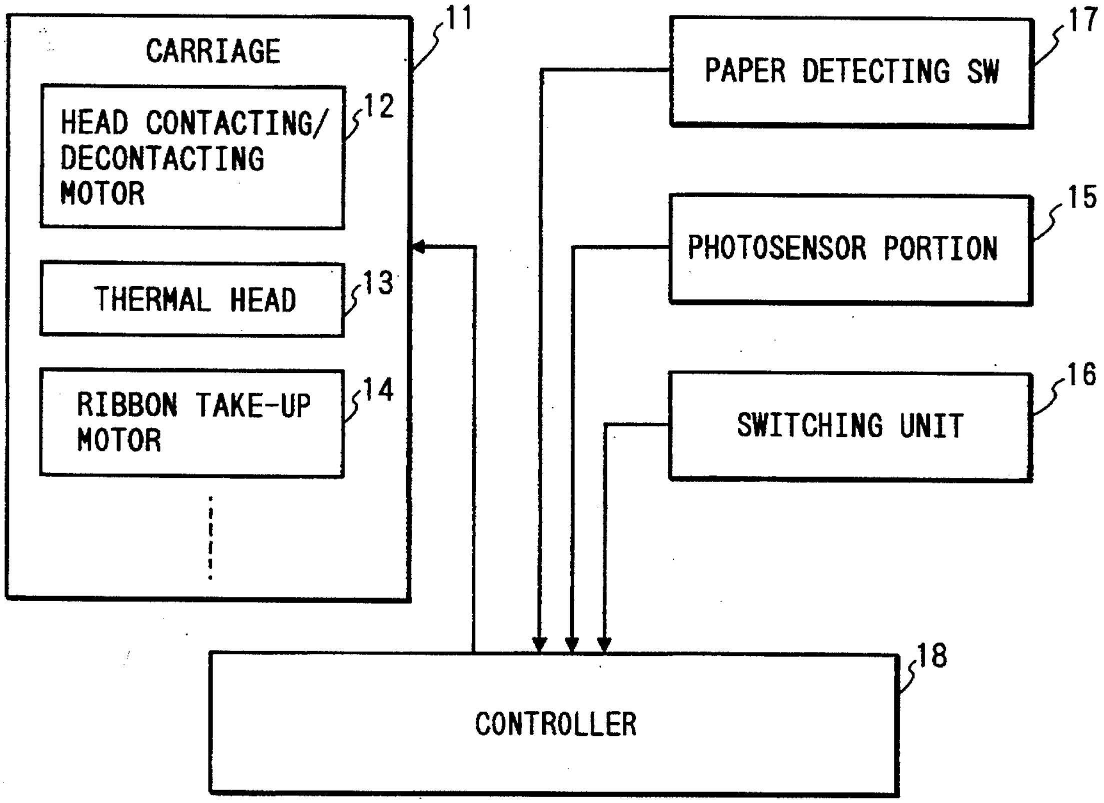
FIG. 2 is a block diagram showing a drive circuit in the thermal printer illustrated in FIG. 1.

As schematically shown in FIGS. 1 and 2, a thermal printer of this embodiment has a carriage 11 disposed in opposition to a platen 10 so that it can reciprocate in the extending direction of the platen. Supported by the carriage 11 is a thermal head 13 which can be moved into contact with and away from the platen by the operation of a head contacting/decontacting motor 12. The carriage 11 is constructed so as to carry on the upper surface thereof an ink ribbon cassette 20 which will be described later, the cassette 20 containing an ink ribbon 24 a part of which has been drawn out and positioned between paper for printing and the thermal head 13. On the carriage 11 are disposed an ink ribbon take-up motor 14 and a photosensor portion 15 for sensing a reflected light from a reflecting plate disposed on the ribbon cassette 20 side. The photosensor portion 15 comprises a light emitting element 15*a* for emitting light toward the reflecting plate disposed on the ink ribbon cassette 20 and a light receiving element 15*b* for receiving the light reflected from the reflecting plate.

The printer body is provided with a printing mode switching unit 16 which is in the form of a switch and which is for switching between a first mode as a label making mode involving printing on a receptor tape and a second mode as an ordinary paper printing mode. The second mode is a printing mode for an ordinary paper (e.g. size A4 or B5 paper, or letter size paper), while the first mode as a label making mode is a special mode for printing out onto an elongated receptor tape of about 6 to 15 mm in width. A paper detecting switch 17 as a paper detecting means is disposed on this side of the thermal head in a conveyance path of paper which is fed in the second mode. The photosensor portion 15, mode switching unit 16 and paper detecting switch 17, which detect a printing mode of the printer, paper and ribbon end, are connected to a controller 18 which controls the printing operation on the basis of the results of the detections. The switching unit 16 is not limited to a change-over switch disposed in the printer body. It may be constructed in such a manner that the switching between the second mode as an ordinary paper printing mode and the first mode as a label making mode is performed, for example, in accordance with an input signal provided from a keyboard. Further, the above paper detecting means is not limited to the switch. It may be constructed using a photosensor or the like.

Figure 3:
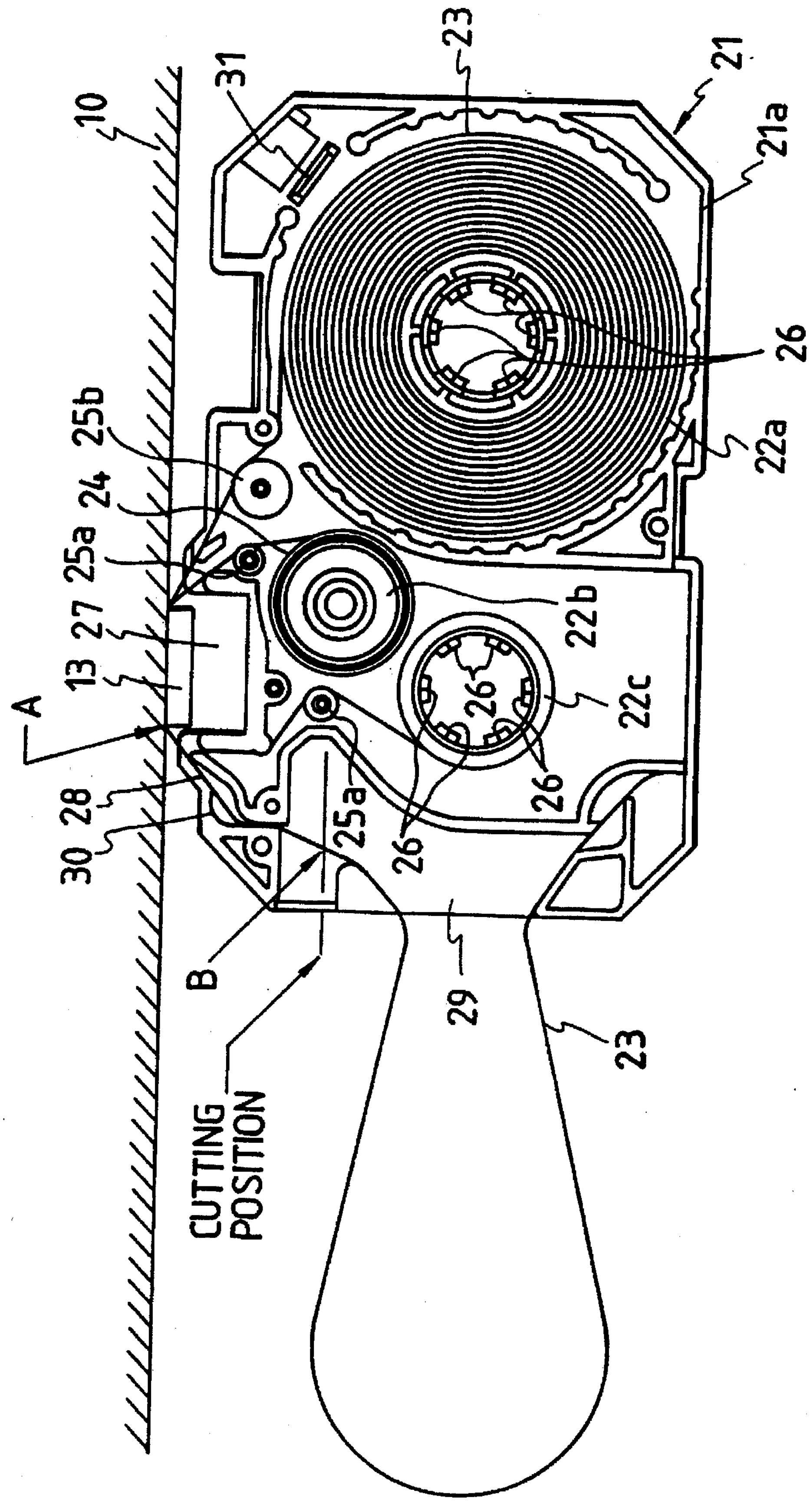
FIG. 3 is a plan view showing an example of a label making ink ribbon cassette for use in the thermal printer illustrated in FIG. 1.

FIG. 3 shows an example of a label making ink ribbon cassette 21 which is used in the first mode as a label making mode in the embodiment schematically illustrated in FIG. 1. The label making ink ribbon cassette 21 has a ribbon cassette case 21*a* which is generally rectangular in plan and within which are rotatably supported three, generally cylindrical cores 22*a*, 22*b* and 22*c*. Of these cores, one core 22*a* has a receptor tape 23 wound therearound, while of the remaining two cores, one core 22*b* has a thermal printing ink ribbon 24 wound thereon and the other core 22c is used for taking up the ink ribbon 24.

Figure 4A:
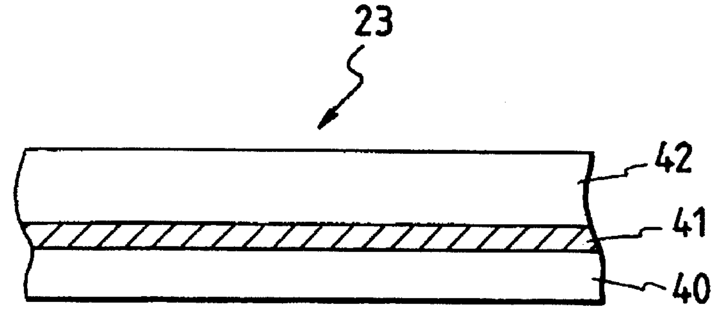
FIGS. 4(*a*) and 4(*b*) are explanatory views showing the construction of a receptor tape and a thermal recording label tape, respectively, which are used in the label making ink ribbon cassette of FIG. 3.
Figure 4B:
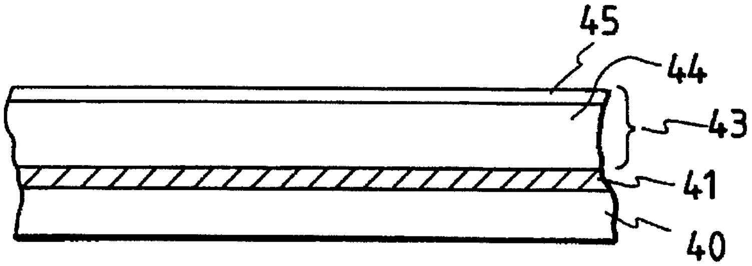

As shown in FIG. 4(*a*), the receptor tape 23 comprises three layers of a release paper 40, an adhesive portion 41 and a printing portion 42. Along the traveling paths of the ink ribbon 24 and the receptor tape 23 are disposed a plurality of guide rollers 25*a* and 25*b* which are supported rotatably. In the case of using as a label tape a thermal paper which develops color thermally, the tape comprises the release paper 40, adhesive portion 41 and a printing portion 43 which comprises a substrate 44 and a color developing layer 45 formed thereon, as shown in FIG. 4(*b*). It goes without saying that the use of a label tape of this type eliminates the need of using the ink ribbon.

In the inner peripheral surface of the core 22*a* with the receptor tape 23 wound thereon and that of the core 22*c* disposed for taking up the ink ribbon 24 there are formed a plurality of key ways 26 in a spline shape and in a circumferentially spaced state. A delivery bobbin 19*a* (FIG. 1) provided projectingly on the carriage 11 of the printer comes into engagement with the inner peripheral surface of the core 22*a* positioned on the right-hand side in FIG. 3 and with the receptor tape 23 wound thereon. On the other hand, a take-up bobbin 19*b* (FIG. 1) provided projectingly on the carriage 11 comes into engagement with the inner peripheral surface of the core 22*c* disposed on the left-hand side in FIG. 3 for taking up the ink ribbon 24.

The ribbon cassette case 21*a* is formed with a recess 27 in which is disposed the thermal head 13 as a printing head. An intermediate part of the ink ribbon 24 and that of the receptor tape 23 are drawn out into the recess 27. The receptor tape 23 is drawn out from the core 22*a* onto which it is wound and is guided up to the position of the thermal head 13 by way of the guide roller 25*b*. After printing, the receptor tape 23 is guided so as to move away from the platen 10 (FIG. 1) by means of a guide portion 28 formed near the recess 27 of the ribbon cassette 21*a* in which recess is disposed the thermal head 23. Then, the tape 23 is conducted through a guide path 30 into a receptacle portion 29 formed in the ribbon cassette case 21a. Thus, according to the illustrated construction, the receptor tape 23 which has been used for printing can be recovered.

The ink ribbon cassette to be used in the second mode as an ordinary paper printing mode is here assumed to have the same construction as that of the ink ribbon cassette shown in FIG. 10 which has previously been described in detail in connection with the prior art and which contains only the ink ribbon.

The label printing operation using the thermal printer of the embodiment will be described below in operational sequence and with reference to FIG. 2.

First, prior to operation of the thermal printer of the embodiment, printing conditions in the label making mode such as the width of the receptor tape 23, whether the indication of dotted lines for cutting is present or not, and the label length, are inputted to the controller 18 of the thermal printer by the use of an input means such as a keyboard or the like. The ink ribbon cassette 21 for label printing is put on the carriage 11 of the printer, then the mode switching unit 16 is set to the label making mode, namely, the first mode, and printing is started.

At this time, when the controller 18 detects a printing signal, the presence or absence of paper is checked by the paper detecting switch disposed in the paper conveyance path.

Description is now directed to the relation between the paper detecting switch 17 and the label making operation. In the second mode as an ordinary paper printing mode, once the presence (ON) of paper is detected by the paper detecting switch 17 disposed in the paper conveyance path, a shift is made to the printing operation. On the other hand, the state of absence (OFF) of paper is handled as error by the controller 18 because it is impossible to effect printing.

If printing is performed in the first mode as a label making mode and in the presence of an ordinary type of paper, the receptor tape 23 is not drawn out from the interior of the ribbon cassette case 21 by the pressing force of the thermal head 13 because the frictional force between the paper and the receptor tape 23 is small. Therefore, in the label making mode, contrary to the second mode as an ordinary paper printing mode, once the presence (ON) of paper is detected by the paper detecting switch 17, this state is handled as error by the controller 18. This error can be indicated, for example, by inhibiting the shift to the next operation, or by displaying an error message on a screen, or by lighting an LED or making a sound or a voice to inform the user of the error.

Thus, in the thermal printer of this embodiment having the paper detecting switch 17, the presence or absence of paper is detected, and in the first mode as a label making mode, the error processing is performed in the presence of paper, while in the second mode as an ordinary printing mode, the error processing is conducted in the absence of paper.

The printing position is controlled in accordance with the same printing signal.

When the thermal printer of this embodiment is used in the second mode as an ordinary printing mode, the development of dots in a dot pattern is always from the upper side.

Figure 5:
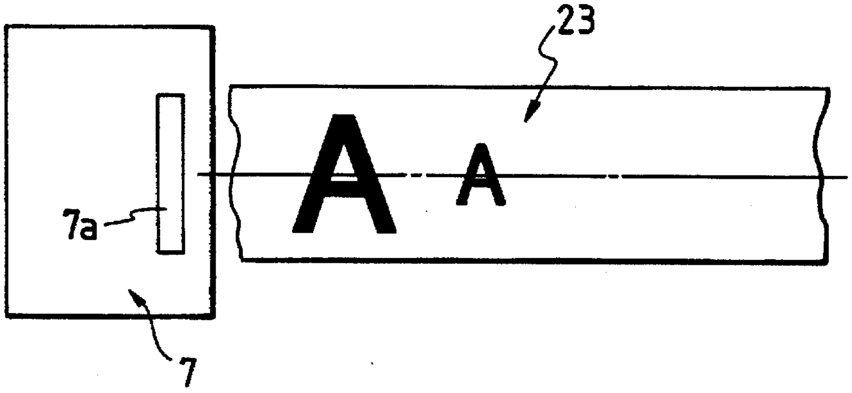
FIG. 5 is an explanatory view showing an example of a character pattern which is printed centrally in the width direction of label by means of the thermal printer of the embodiment.

On the other hand, in the first mode as a label making mode, it is necessary to print a printing pattern in such manner that the center of each print coincides with the central part in the width direction of the receptor tape 23, as shown in FIG. 5. The printing position for the receptor tape 23, that is, which portion of a heating element train 7*a* of the thermal head 13 is to be used for printing, is controlled by the controller 18.

When the printing signal is detected by the controller 18 in the first mode as a label making mode, the center in the vertical direction of the printing pattern and the center in the width direction of the receptor tape 23 are made coincident with each other by the controller 18, which controls the development of dots in the printing pattern vertically equally. In this state there is performed printing.

According to the thermal printer having the controller 18 which thus controls the printing position, since printing is done for the transversely central part of the receptor tape 23 in the first mode as a label making mode, it is possible to obtain a vertically well-balanced result of printing.

Upon detection of the printing signal, there is made a printing width control for oversized characters in each mode. In the second mode as an ordinary paper printing mode there is no special restriction on the printing of N-fold size characters, but in the first mode as a label making mode, since the width of the receptor tape 23 is predetermined, a printing pattern of oversize characters larger than the width of the tape 23 will protrude from the tape.

In the first mode as a label making mode, therefore, an instruction to print a printing pattern larger than the width of the receptor tape 23 which width has been given beforehand by the controller 18 is handled as error. This error processing can be done, for example, by inhibiting the shift to the next operation, or by displaying the state of error on a screen, or by lighting an LED or making a sound or a voice to inform the user of the error.

If the above conditions are satisfied and the printing signal is not interrupted by the controller 18, the carriage 11 of the printer operates and the thermal head 13, head contacting/decontacting motor 12 and ribbon take-up motor 14 start operation, whereby printing is performed.

Figure 6A:
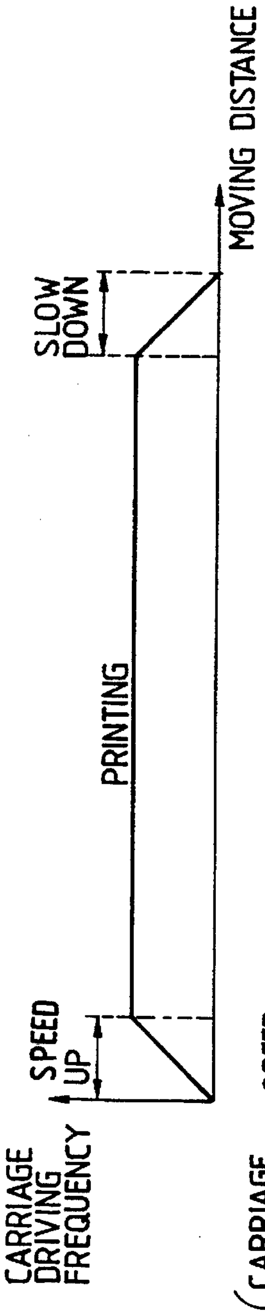
FIGS. 6(A) and 6(B) are explanatory diagrams showing carriage drive timing modes in the thermal printer of the embodiment, which modes are as follows.

FIG. 6(*a*) is a diagram showing motions of the carriage 11 in the second mode as an ordinary paper printing mode. First, upon detection of the printing signal, the carriage 11 accelerates (speed-up), then travels at a constant speed while printing is performed in suitable positions, then the carriage decelerates (slow-down) and returns to the printing start position of the next line, and after the line feed operation, the above operations are repeated.

Figure 6B:
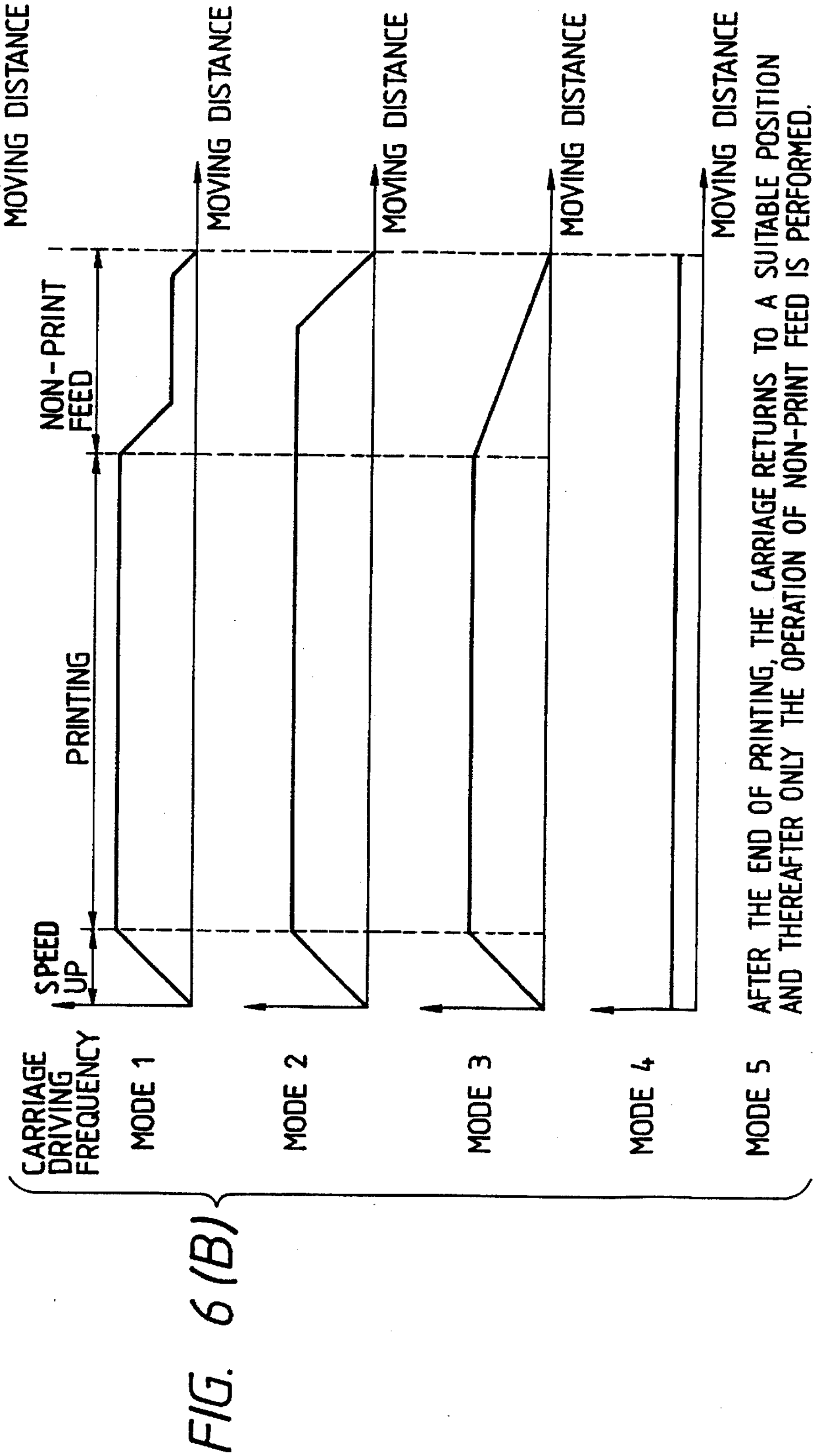

Modes 1 to 5 in FIG. 6(b) show motions of the carriage 11 in the first mode as a label making mode, using different carriage driving methods in the operation of non-print feed. The operations until the end of printing to the receptor tape 23 is the same as in the second mode described above, but after printing it is necessary to perform the operation of non-print feed for feeding out the receptor tape 23 by a predetermined amount. It is necessary that the said amount of tape feed correspond at least to the shortest distance (the distance between A and B in FIG. 3) of tape travel in the ribbon cassette case. This operation of non-print feed is controlled by the controller 18.

More specifically, upon detection of the end of printing on the basis of the printing signal, the controller 18 performs a non-print feed by the predetermined amount, then after the end of the non-print operation, the controller causes the carriage 11 central position of the printer body. In this position, the receptor tape 23 is cut, and the above operations are repeated by a required number of times to make labels.

Thus, according to the thermal printer of this embodiment having the controller 18 which controls the non-print feed, the receptor tape 23 after printing is fed in a non-print state in the label making mode, whereby the printed tape 23 can be conveyed up to the cutting position.

In the label making mode, it is necessary to cut the receptor tape 23 into a desired label length after the end of label printing.

Dotted lines 32 for cutting which indicate such label length are printed onto the receptor tape 23 after the end of printing of a desired printing pattern, as shown in FIG. 7. This is controlled by the controller 18. More specifically, the controller 18 makes control to print the dotted lines 32 onto the tape 23 after printing in accordance with a preset label length. By cutting the tape 23 along the dotted lines 32 there can be obtained a label having the preset length.

By curving the dotted lines 32 it is also made possible to obtain an aesthetic sense of the label obtained.

Description is now directed to controlling the head contacting/decontacting motor 12 which causes the thermal head 13 to perform its leaving motion during printing in each mode.

In the printing operation of the second mode as an ordinary paper printing mode, if there is a blank space area of a certain size or larger between characters, the pressing of the thermal head 13 against the platen 10 is released in that blank space area, so that the thermal head moves away from the platen, then in the position of the next character the thermal head is again pressed against the platen. This function is usually adopted. Since the thermal printer of the ordinary type is constructed in such a manner that the ink ribbon winding operation is stopped upon release of the pressed state of the thermal head, an extra consumption of the ink ribbon is prevented by the said leaving motion of the thermal head 13.

On the other hand, in the printing operation of the label making mode, the ribbon cassette 21 is constructed so that the receptor tape 23 and the ink ribbon 24 are drawn out the same length at a time, so if the above leaving motion is performed during printing at every presence of a blank space area of a certain size or larger between characters in the label making mode, not only the ink ribbon 24 but also the receptor tape 23 is no longer drawn out. Therefore, in the case of printing such a pattern as shown in FIG. 8(*a*) wherein a blank space area of a preset length is present between specific characters, there is not obtained the expected layout, but there will be obtained such a layout as shown in FIG. 8(*b*) wherein characters are arranged side by side at equal intervals without leaving any blank space area. In the label making mode, therefore, it is necessary that printing be performed in the pressed state of the thermal head 13 from beginning to end of the printing to obtain the expected result such as that shown in FIG. 8(*c*).

Accordingly, in the label making mode, the controller 18, upon detection of a printing instruction, prohibits the leaving motion of the thermal head 13 and controls printing, whereby there can be obtained the expected printing result having blank space areas on the receptor tape 23. In the second mode as an ordinary paper printing mode, the leaving motion of the thermal head 13 is performed and printing is carried out, whereby it is made possible to effect saving of the ink ribbon 24.

The following description is now provided about detecting the end of the ink ribbon and detecting the ink ribbon cassette in each mode.

In the thermal printer of the ordinary type, as mentioned above, the photosensor portion 15 for detecting ribbon end of the ink ribbon 24 is mounted on the carriage 11 which carries the ink ribbon cassette thereon. As an example of the ribbon end detecting method, reference is here made to the construction illustrated in FIGS 9(*a*) and 9(*b*).

In FIG. 9(*a*) and 9(*b*) if the ink ribbon 24 is still employable, the light receiving element 15*b* of the photosensor portion 15 is OFF, while when the ribbon end is opposed to the light receiving element 15*b*, the light receiving element repeats ON and OFF since the ribbon end has a zebra pattern comprising transparent portions (hatched portions in the figure) and black portions (net pattern portions in the figure).

In such a combination type printer capable of performing both printing for an ordinary type of paper and a label making operation, if printing is conducted with the ink ribbon cassette for ordinary paper printing carried on the carriage, for example in the label making mode, there sometimes occurs an inconvenience such that characters are printed directly onto the platen because the receptor tape 23 is not present.

To avoid such inconvenience, in the label making mode, a reflector 31 may be stuck on the label making ink ribbon cassette 21 in a position corresponding to the photosensor portion 15 which is provided on the carriage of the printer, as shown in FIG. 3, and by detecting ON-OFF of the photosensor portion 15 through the controller 18, it is made possible for the controller to make sure that the ink ribbon cassette carried on the carriage is the label making ink ribbon.

When the label making ink ribbon cassette 21 is loaded onto the carriage 11, the photosensor portion 15 detects the reflected light from the reflector 31, and the controller 18 detects ON of the photosensor and makes control to start printing. On the other hand, when the ink ribbon cassette for the printing of an ordinary type of paper is loaded onto the carriage, the photosensor portion 15 detects nothing from the reflector 31, and the controller 18 detects OFF of the photosensor and handles this state as error. The method of this error processing is the same as the foregoing method.

The present invention is not limited to the above embodiment. For example, a label tape may be made by thermal recording using as a label making cassette only a tape constituted by a thermal paper that develops color thermally. Further, various modifications may be made as necessary.

According to the present invention, as set forth hereinabove, a single thermal printer can be used both as a printer for printing characters onto an ordinary type of paper and as a label making printer by switching the printing modes from one to the other. Further, by using a controller having a special function to control printing in the label making operation, it is made possible to obtain a label in a good printing condition which label is nice-looking also in point of layout.

We claim:

1. A thermal printer including a reciprocating carriage with a thermal head carried thereon, the thermal head having a plurality of heating elements, said thermal printer comprising:

a switching unit for switching said thermal printer between a label making mode for printing characters onto a receptor tape and a printing mode for printing characters onto an ordinary type of printing paper;

a controller for controlling a printing operation in accordance with a selected one of said label making mode and said printing mode; and a paper detecting means in a paper conveyance path of the printer for detecting the presence of the printing paper in said paper conveyance path and for transmitting a detection signal to the controller when the printing paper is present, wherein the printing operation is controlled in accordance with both the detection signal indicative of the presence of the paper provided from said paper detecting means and the selected one of said label making mode and said printing mode, wherein the controller discontinues the printing operation in the label making mode in response to the detection signal transmitted by the paper detecting means.

2. A thermal printer according to claim 1, wherein, when the thermal printer is in the label making mode, the controller controls the thermal head and the carriage such that, after completion of the printing operation, the carriage is moved while the thermal head remains in contact with a platen, thereby feeding the receptor tape a predetermined amount.

3. A thermal printer according to claim 1, wherein the controller further comprises means for storing a width of the receptor tape;

wherein said controller includes an error signal generating means for generating an error signal; and wherein when the thermal printer is in the label making mode, when said thermal printer receives a printing instruction to print characters larger than the width of the receptor tape, said controller discontinues the printing operation and said error signal generating means generates an error signal.

4. A thermal printer including a reciprocating carriage with a thermal head carried thereon, the thermal head having a plurality of heating elements, said thermal printer comprising:

a switching unit for switching said thermal printer between a label making mode for printing characters onto a receptor tape and a printing mode for printing characters onto an ordinary type of paper; and a controller for controlling a printing operation in accordance with a selected one of said label making mode and said printing mode, the controller including means for storing a width of the receptor tape;

wherein when the thermal printer is in the label making mode, when said thermal printer receives a printing instruction to print characters larger than the width of the receptor tape, said controller discontinues the printing operation and generates an error signal; and wherein, when the thermal printer is in the label making mode, the controller controls the thermal head and the carriage such that, after completion of the printing operation, the carriage is moved while the thermal head remains in contact with a platen, thereby feeding the receptor tape a predetermined amount.

5. A thermal printer selectively changable between a printing mode and a label making mode, wherein, in the printing mode, ink is transferred from a first ink ribbon onto a printing sheet, the first ink ribbon being wound in an ink ribbon cassette, and wherein, in the label making mode, ink is transferred from a second ink ribbon onto a receptor tape, both the ink ribbon and the receptor tape being wound in a label making cassette, the thermal printer comprising:

a platen;

a carriage movably mounted to reciprocate along the platen, the carriage adapted to receive either of the ink ribbon cassette and the label making cassette;

a thermal head mounted on the carriage, the thermal head having a plurality of heating elements and being movable to press one of the first ink ribbon against the printing sheet and the second ink ribbon against the receptor tape; and a controller for controlling a printing operation in accordance with a selected one of said label making mode and said printing mode;

wherein, in the label making mode, the carriage moves the label making cassette along the platen while the thermal head presses the second ink ribbon and receptor tape against the platen and the heating elements are activated to transfer ink from the second ink ribbon onto the receptor tape.

6. The thermal printer according to claim 5, wherein the controller includes an error signal generating means for generating an error signal;

wherein the thermal printer further comprises a sensor located in a conveyance path of the printer for detecting the presence of the printing sheet in the conveyance path, and for generating a detection signal in response thereto; and wherein, when the thermal printer is in the label making mode, the controller discontinues the printing operation and the error signal generating means generates an error signal in response to the detection signal.

* * * * *